United States Patent [19]

Fishel

[11] 3,759,092

[45] Sept. 18, 1973

[54] DIFFERENTIAL PRESSURE TRANSDUCER AND READOUT FOR SENSING CLAW GRIP FORCE

[75] Inventor: Kenneth R. Fishel, Del Mar, Calif.

[73] Assignee: The United States of America as represented by the Secretary of the Navy

[22] Filed: June 9, 1971

[21] Appl. No.: 151,336

[52] U.S. Cl.................73/141 R, 73/94, 214/1 CM, 214/147 G
[51] Int. Cl...............................................G01l 1/02
[58] Field of Search..........73/133, 141 R, 94, 170 A; 294/66 A, 66 R; 214/1 CM, 147 G

[56] References Cited

UNITED STATES PATENTS

| 2,861,701 | 11/1958 | Bergsland et al..73/141 R UX |
| 3,400,541 | 9/1968 | Lloyd et al..........214/1 CM X |
| 3,422,965 | 1/1969 | Lloyd.....................214/1 CM |
| 3,454,169 | 7/1969 | Bridges..............214/147 G X |

Primary Examiner—Charles A. Ruehl
Attorney—Richard S. Sciascia, Ervin F. Johnston and Thomas G. Keough

[57] ABSTRACT

A submersible having an externally mounted hydraulic system is provided with a differential pressure transducer connected between the supply and return lines which articulate a remotely disposed claw. The transducer is responsive to produce a signal representative of the pressure differential between the internal pressures in the lines. This signal is fed through the pressure hull of the submersible to an internally carried meter to enable the determination of the claw's gripping force. Although the meter actually "reads" differential pressure, it is calibrated in units of grip force, in this case, pounds (OF FORCE). This is possible because the differential pressure is proportional to the claw grip force. Being thusly arranged, the sensing or readout devices are removed from the near proximity of the claw and are less vulnerable to damage.

3 Claims, 2 Drawing Figures

DIFFERENTIAL PRESSURE TRANSDUCER AND READOUT FOR SENSING CLAW GRIP FORCE

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

Using manipulators or claw-like clamps mounted on a submersible requires knowledge of the magnitude of gripping force exerted. If there is too little gripping force, obviously the claw will be unable to hang onto an object, when moving or securing it. On the other hand, if too much force is exerted, damage of the object is likely. To meet this problem, several methods of monitoring claw grip force have been proposed. One method of obtaining the desired information calls for mounting strain gauges on the claws at stressed areas and to provide readouts either mounted externally on the submersible that are observed through viewing ports, or internally by passing the electrical signals through hull penetrators. The gauges are sensitive to environmental pressure and temperature, and to the length of conductors and are vulnerable to damage. They also require pressure compensated electronic packages which further complicate the overall design. Another approach calls for passing the hydraulic control lines through the pressure hull to the claws and monitoring the applied pressure directly from the lines with pressure gauges contained inside the submersible. However, such a technique imposes a safety hazard since hydraulic penetrators at the pressure hull interface cannot be made failsafe as extreme depths.

SUMMARY OF THE INVENTION

The present invention is directed to providing an improvement in indicating means for submersibles carrying an external hydraulic system including a source of hydraulic pressure feeding a control unit which selectively controls the internal pressure in a supply line and a return line to actuate a clamping device. A meter is carried in the submersible and is electrically coupled to a pressure differential transducer connected between the supply line and return line, hydraulically in parallel with the device but safely, remotely disposed from it. Signals representative of the pressure differential between the internal pressure in the supply line and the internal pressure in the return line are fed to the meter and an accurate indication of the force exerted by the device is provided.

The prime object of the invention is to provide a means for determining the gripping force exerted by a hydraulically actuated claw.

Another object is to provide a gripping force indicator which is removed from the work area and therefore less vulnerable to damage.

Yet another object is to provide a force indicator for submersibles not requiring elaborate hull penetrators or packings passing through the pressure hull.

These and other objects of the invention will become more readily apparent from the drawings when taken with the ensuing description.

DESCRIPTION OF THE PREFERRED EMBODIMENT

Figure 1:
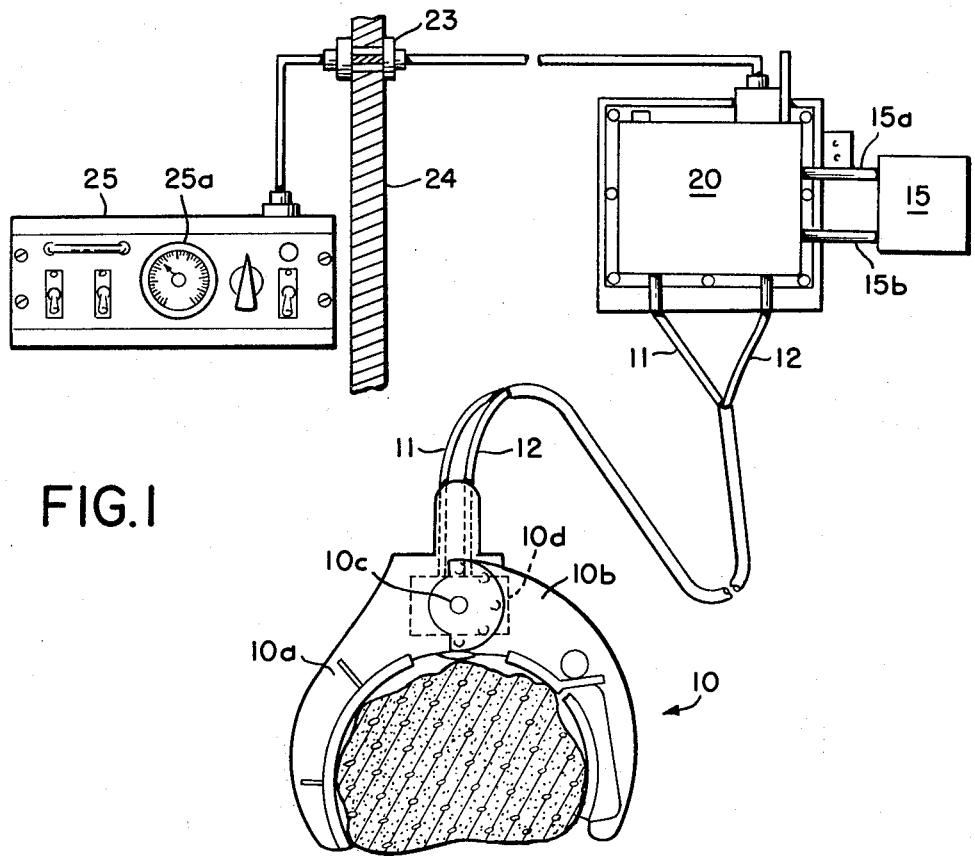
FIG. 1 is a schematic drawing of the invention.

Referring now to the drawings, FIG. 1 depicts a representative hydraulically actuated claw or manipulator 10 normally carried on the exterior of a submersible and used to pick up objects or move them about. The supporting framework, structure joining the claw and submersible, and the means for positioning the claw with respect to the object to be grasped, are not shown in the drawings since their inclusion is unnecessary to facilitate an understanding of the present invention. Furthermore, while a claw is depicted, a press, jack or similar hydraulically actuated device, optionally is substituted, the only requirement being that the device requires a supply line 11 and a return line 12 for hydraulically transferring forces.

In the representative claw shown, a pair of jaws, 10a and 10b are pivotally mounted on a pin 10c for opposed pivotal motion. The pivotal motion is imparted by a hydraulic actuator 10d carried behind the jaws which is responsive to the internal hydraulic pressure in lines 11 and 12. In a simple form, the actuator is no more than a pair of hydraulic pistons suitably interconnected and mechanically linked to the jaws. Whether the jaws open or close or transfer a variable force is established by the hydraulic pressure differential between the supply line and the return line.

The hydraulic pressure differential acting on the actuator, rotates the jaws about their pivot to transmit a proportional gripping force on the object, shown in cross section, permitting its retrieval. In this example, when the pressure differential is reversed, or turned off, the jaws swing to the open position. Although any number of a variety of schemes are well known in the art by which a hydraulic gripping is achieved, the aforegoing claw arrangement and its mechanical coaction are referred to merely to show one representative force transmitting device dependent on a hydraulic system having a supply line and a return line.

Upstream from the claw, the other vital elements of a hydraulic system provide the variable pressure needed for operation. A conventional source of hydraulic pressure 15, shown in block diagram form, provides a suitable level of hydraulic force for articulating the claw. A feeder supply line 15a and a feeder return line 15b extending from appropriate fittings serve as conduits for transferring an "on" or "off" supply of hydraulic pressure preferably at constant magnitudes to a remotely actuated hydraulic pressure control unit 20.

The hydraulic pressure control unit is filled with oil 21 to render the unit insensitive to ambient pressure changes as the submersible changes its depth in the ocean. Here it should also be mentioned that the source of hydraulic pressure is similarly pressure compensated. Within the control unit a control mechanism 22 is fabricated according to contemporary electrohydraulic design criteria to allow variation of the pressure received from source 15 and to feed it to a pair of supply lines 11 and 12 as required. Elaboration on exact hydraulic manifold, valving, servo controls, and switching arrangement is not felt to be necessary at this point, since a routineer would select a suitable combination from commercially available units once the magnitudes of the source pressure and the supply and return pressures are determined.

The unit is chosen once the foregoing parameters are known and is selectively controllable by electrical leads 22a reaching from control mechanisms 22 through a packing 23 extending through a submersible's pressure hull 24 to a remote control unit 25.

Figure 2:
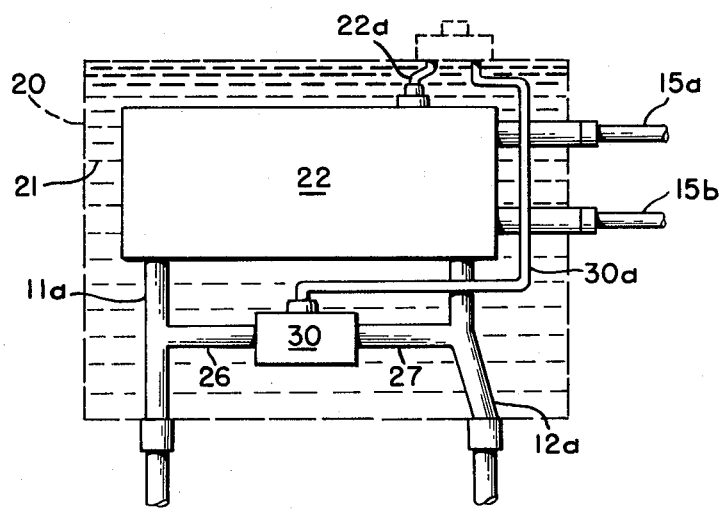
FIG. 2 is a schematical representation of the hydraulic interconnection of the pressure differential transducer.

Noting FIG. 2, also contained within the hydraulic pressure control unit and between the control mechanism and the claw, a portion 11a of the supply line and a portion 12a of the return line have two sections 26 and 27 of a traverse duct connected in fluid communication. Interposed between these two sections a pressure differential transducer 30 fluidly communicates with the supply and return lines via the sections of duct.

A very suitable commercially available pressure differential transducer has been selected and is identified as a Model $p3d$ manufactured and marketed by Witaker-Pace Corp., Instrument Systems Div. This model is sensitive to two sources of hydraulic pressure to generate a signal which is proportional to the pressure difference between the two sources. While the Model $p3d$ is quite adequate there are a goodly number of marketed transducers which provide the proper response signals and may rely upon the deformation of a resilient diaphragm, or piezoelectric material or upon a variable inductance or capacitance scheme for producing a measurable change in some electrical property which is fed from the transducer via leads 30a.

The representative signals reach remote control unit 25 via the leads and on a signal responsive meter having an appropriately scaled dial 25a, which may calibrate in units of force, a visual indication is presented of the force exerted by the claw, such force being proportional tO the pressure differential between the internal pressure found in the supply line to the internal pressure found in the return line. More specifically, and by way of example, if the internal pressure in supply line 11 is 100 pounds and the internal pressure in the return line is 20 pounds then a "hydraulic loss" of 80 pounds has been converted into a gripping force between the two jaws. That is to say, a hydraulic force of 80 pounds is exerted by actuator 10d, to cause a directly proportional gripping force as governed by the jaws+ physical dimensions and mechanical advantages.

It is apparent that since pressure sensing device 30 is far removed from the claws, the possibility of damage to the device is minimized. In addition, only control leads 22a and transducer leads 30a penetrate the pressure hull of the submersible to not unduly impose depth limitations as would large packings.

Obviously any modification and variations of the present are possible in the light of the above teachings, and, it is therefore understood that within the scope of the disclosed inventive concept, the invention may be practiced otherwise than specifically described.

What is claimed is:

1. In an apparatus for providing an indication in the interior of a submersible of the force exerted by an externally carried hydraulic system formed of a source of hydraulic pressure feeding a control unit for selectively changing the internal pressure in a supply line and a return line coupled to a device for exerting said force, an improvement therefor is provided comprising:

means responsive to electrical signals to produce an indication of said force disposed in said interior;

electrical conductor means joined to the responsive means and extending through the pressure hull of said submersible; and means electrically coupled to said conductor means and connected between said supply line and said return line, hydraulically in parallel with said device and remotely disposed therefrom for providing said electrical signals representative of the pressure differential between the internal pressure in said supply line and the internal pressure in said return line thereby ensuring said indication of said force.

2. An apparatus according to claim 1 in which the providing means is a pressure differential transducer connected between said supply line and said return line by a pair of feeder ducts.

3. An apparatus according to claim 2 in which said pressure differential transducer is disposed in a pressure compensated medium rendering it insensitive to ambient pressure changes.

* * * * *